United States Patent [19]

Hall et al.

[11] Patent Number: 6,032,051
[45] Date of Patent: Feb. 29, 2000

[54] WIRELESS MOBILE COMUNICATION DEVICES FOR GROUP USE

[75] Inventors: Hans Hall; Stefan Willehadson; Jan Gabrielsson, all of Uppsala, Sweden

[73] Assignee: Telefonaktiebolaget L/M Ericsson, Stockholm, Sweden

[21] Appl. No.: 08/980,741

[22] Filed: Dec. 1, 1997

[51] Int. Cl.[7] ................................................ H04B 7/00
[52] U.S. Cl. ........................ 455/518; 455/566; 455/575
[58] Field of Search .................................. 455/527, 67.7, 455/38.4, 566, 575, 456, 457, 414, 518, 554, 528, FOR 121, 88, 11.1; 379/32, 34

[56] References Cited

U.S. PATENT DOCUMENTS 3,678,391  7/1972  Gough .
5,420,577  5/1995  Kim et al. .
5,564,071  10/1996  Liou et al. .
5,852,783  12/1998  Tabe et al. .............................. 455/566
5,854,825  12/1998  Mukaihara et al. ...................... 379/34

FOREIGN PATENT DOCUMENTS 9713382  4/1997  WIPO .

Primary Examiner—Thanh Cong Le
Assistant Examiner—Thomas B. Ahn
Attorney, Agent, or Firm—Jenkens & Gilchrist, P.C.

[57] ABSTRACT

Wireless mobile communication devices automatically transmit therebetween information regarding the status of the devices. This permits the devices to be used effectively by members of a group or team performing a given task.

32 Claims, 9 Drawing Sheets

Phone A                          All Other Phones

→ PING \<A-status\> \<A-id\> →
← PONG(s) \<status\> \<id\> ←

*FIG. 4*

Phone A                          All Other Phones

→ PONG \<A-status\> \<A-id\> →

*FIG. 5*

Phone A                          Phone B

→ PING \<A-status\> \<A-id\> →
← PONG \<B-status\> \<id\> ←

*FIG. 6*

Phone A                          Phone B

→ PONG \<A-status\> \<A-id\> →

WIRELESS MOBILE COMUNICATION DEVICES FOR GROUP USE

FIELD OF THE INVENTION

The invention relates to wireless mobile communication devices and, more particularly, to wireless mobile communication devices arranged to support communications within a group of users.

BACKGROUND OF THE INVENTION

FIG. 1 illustrates a conventional wireless communication system including a public switched telephone network 11 which communicates with a mobile services switching center 13. The mobile services switching center 13 also communicates with a home location register (HLR) 15 and a plurality of base stations at 17. The base stations 17 communicate with mobile communication devices 19 via the air interface 18.

FIG. 2 illustrates a conventional arrangement wherein a group of wireless mobile communication devices 19 communicate with one another over various channels at 21. The channels at 21 represent the communication channels provided by the system of FIG. 1. The mobile communication devices at 19 also communicate with one or more stationary devices at 23 via the channels 21.

One conventional example of a stationary device at 23 is the home location register 15 of FIG. 1. Example FIG. 10 illustrates a conventional arrangement similar to FIG. 2, including a plurality of mobile communication devices 19 communicating among themselves and with the home location register 15 via various channels 21.

The channels at 21 are typically implemented using any of the following conventional examples: Short Message Service (SMS); General Packet Radio Service (GPRS); Unstructured Supplementary Service Data (USSD); and Cellular Digital Packet Data (CDPD).

It is very common today for a group of persons to utilize respective wireless mobile communication devices 19 for example wireless telephones, to communicate with one another in order to accomplish a certain task. For example, teams of security personnel, transportation crews, and arrangers of various other events often utilize a plurality of wireless mobile communication devices for communication with one another during performance of their assigned tasks. The communication device 19 conventionally includes a memory having stored therein a listing of phone numbers of other group members. This permits the user to retrieve from the memory the phone number of another member of the group. Thus, one group member can call another group member at any time without memorizing the phone number of the other group member.

If a first group member wishes to check the status of a second group member, for example, to determine whether or not the second group member is busy, conventional arrangements require the first group member to manually enter the phone number of the second group member and contact him via a conventional wireless communication session such as a telephone call. That is, there is no way for the first group member to know the status of the second group member without manually entering the phone number of the second group member and establishing a wireless communication session with the second group member. Moreover, conventional arrangements require the first group member to contact each and every group member individually in the above-described manner in order to check the status of all members of the group.

It is therefore desirable to provide a wireless mobile communication device arranged to permit a first member of a group to automatically monitor the status of another member of the group without manually establishing a wireless communication session with the other group member.

The present invention permits a group member to automatically monitor the status of any other group member without manually establishing a wireless communication session with the other group member.

BRIEF DESCRIPTION OF THE DRAWINGS

FIG. 4 illustrates an example of communication between wireless mobile communication devices according to the present invention.

FIG. 5 illustrate another example of communication between wireless mobile communication devices according to the present invention.

FIG. 6 illustrates another example of communication between wireless mobile communication devices according to the present invention.

FIG. 7 illustrates another example of communication between wireless mobile communication devices according to the present invention.

DETAILED DESCRIPTION

Figure 3:
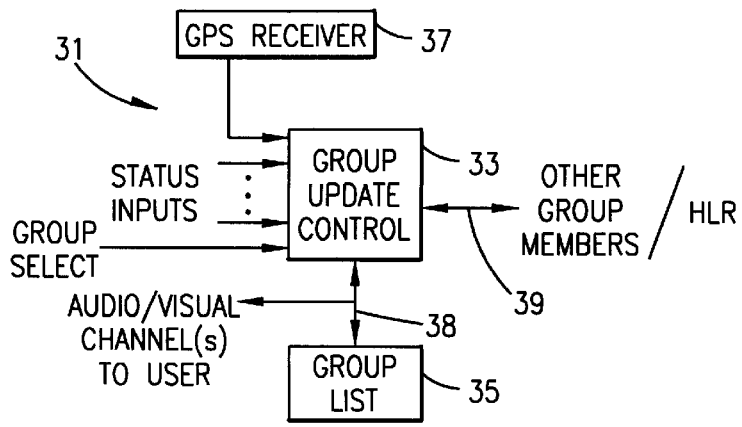
FIG. 3 illustrates pertinent portions of a wireless mobile communication device according to the present invention.

Example FIG. 3 illustrates diagrammatically a wireless mobile communication device 31 according to the present invention. FIG. 3 illustrates only those portions of the wireless mobile communication device 31 necessary to understand the present invention. Various other well-known conventional portions of the wireless mobile communication device are omitted from FIG. 3 for clarity of exposition.

The communication device 31 of FIG. 3 includes group update control logic 33 which receives various status inputs, including a group select input, and an input from a Global Positioning System (GPS) receiver 37 that provides precise geographic location information for the device 31. These status inputs are described in more detail below. The group update control section 31 communicates bidirectionally at 38 with a group list section 35 (for example, a memory) and also communicates bidirectionally at 39 with other wireless mobile communication devices, for example, the wireless mobile communication devices used by other members of a group. Alternatively or in addition to bidirectional communication with other wireless mobile communication devices, the group update control section 33 can communicate bidirectionally at 39 with a home location register HLR. The contents of group list 35 determine which other devices can monitor device 31 and be monitored by device 31. The communication path 38 permits the status of other group members to be communicated to the group list, and to the user via audio and/or visual channels.

Example FIGS. 4–7 illustrate diagrammatically various communications between wireless mobile communication devices according to the present invention. In the examples of FIG. 4–7, the wireless mobile communication devices are wireless mobile telephone having the features of FIG. 3.

Figure 1:
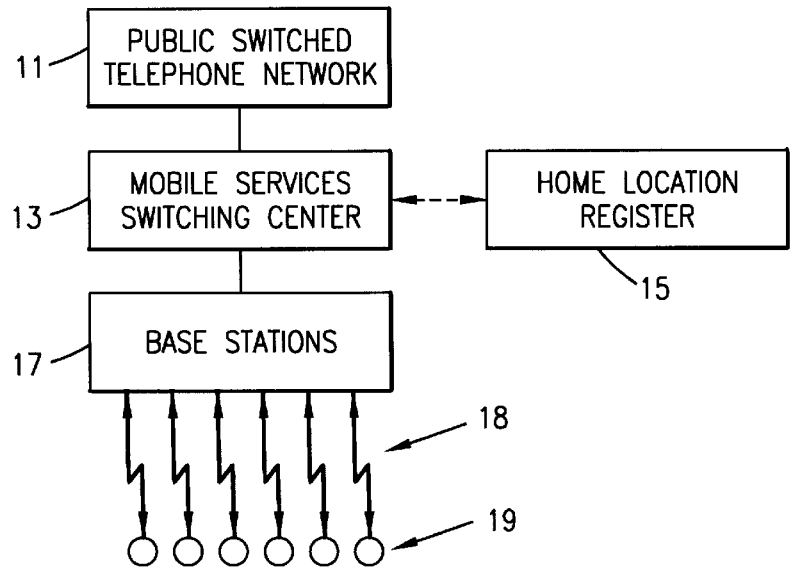
FIG. 1 illustrates a conventional wireless communication system including wireless mobile communication devices.
Figure 2:
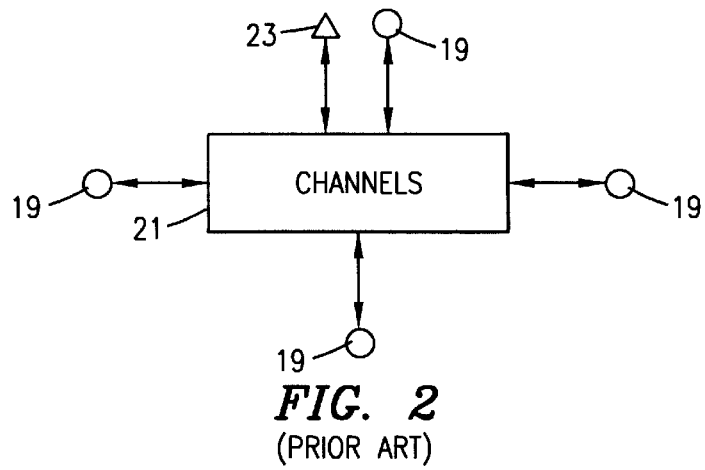
FIG. 2 illustrates various communication channels provided by the conventional wireless communication system of FIG. 1.

In example FIG. 4, phone A sends, via communication path 39 of FIG. 3 and conventional communication channels such as shown at 21 in FIG. 2, a PING message to all other phones in the group. The PING message includes the present status of phone A, for example, whether phone A is busy, idle, etc. The PING message also includes the identity of phone A, for example, the phone number, name of user, etc. In response to the PING message from phone A, every other phone in the group automatically updates its group list 35 to reflect the phone A status just received, and automatically responds to phone A with a PONG message which includes the status and identification of that particular phone. The PING message of FIG. 4 can be broadcast or multicast to all group members' phones, or phone A can send an individual PING message to each of the other phones.

Example FIG. 5 illustrates phone A sending a PONG message to all other phones in the group. The PONG message includes the status of phone A and the identification of phone A as does the PING message of FIG. 4. However, whereas the PING message requires the other phones in the group to send a PONG message in reply to phone A, the PONG message of FIG. 5 does not require a reply from the other phones of the group. The other phones automatically update their group lists to reflect the phone A status just received.

Example FIG. 6 is similar to FIG. 4, except phone A sends a PING message to phone B only. Phone B then automatically updates its group list and responds to phone A with a PONG message.

Example FIG. 7 is similar to FIG. 5, except phone A sends a PONG message to phone B only.

Figure 8:
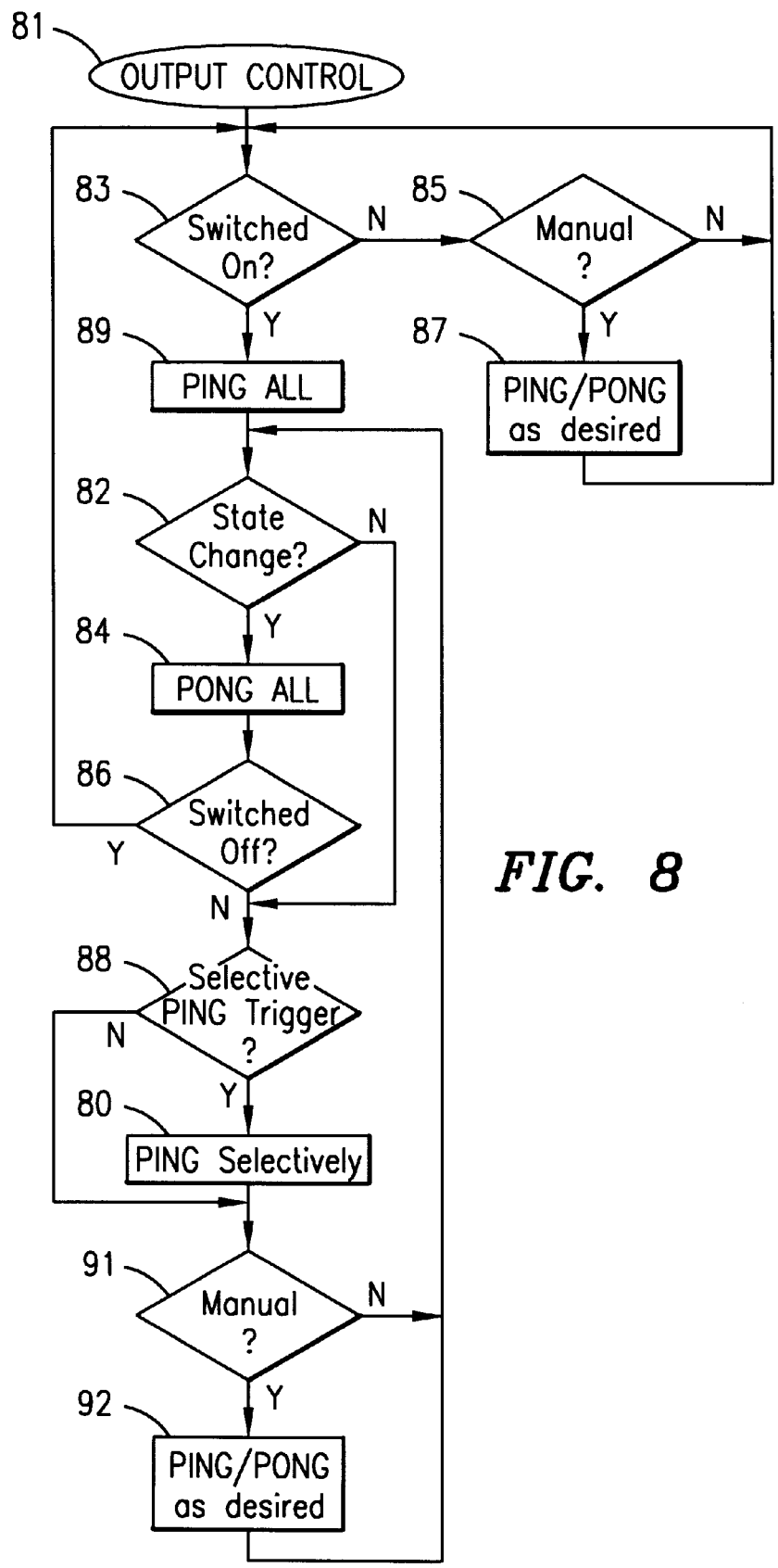
FIG. 8 is a flow diagram of an output control function executed by the group update control block of FIG. 3.

Example FIG. 8 shows communication output control which is implemented in the group update control section 33 of the wireless mobile communication device 31 of FIG. 3. The output control 81 first determines at 83 whether or not the communication device has been switched on. This is determined from one of the status inputs in FIG. 3. If the device 31 has not been switched on at 83, then the output control determines at 85 whether or not the user is manually requesting that a message be sent. If not, then control returns to the decision block at 83. If the user is manually requesting that a message be sent, then either a PING or a PONG message (see FIGS. 4–7) is output at 87 according to which has been manually selected. Thereafter, control returns to the decision block at 83.

If the device has been switched on at 83, then the group update control 33 automatically outputs at 89 a PING message to all other communication devices in the group (see FIG. 4). Thereafter, the output control 81 examines the FIG. 3 status inputs to determine at 82 whether or not a status change has occurred in the communication device. The FIG. 3 status inputs that are monitored at 82 include, for example, the device's on/off switch, an input indicative of whether the user is dialing a phone number, or the location of the mobile unit from GPS receiver 37 (or cell identification in a cellular system). If a status change is detected, then the group update control section 33 automatically sends a PONG message to all other devices in the group at 84 (see FIG. 5). Thereafter, the output control determines at 86 whether or not the state change at 82 was a the mobile communication device being switched off. If so, then control returns to decision block 83.

If it is determined at 86 that the device is not switched off, then the output control determines at 88 whether a predetermined condition exists to trigger a selective PING message to a subset of the other communication devices in the group. It should also be noted that the output control proceeds to the determination at 88 immediately from decision 82 if there is no status change at 82. If it is determined at 88 that a selective PING (or PONG) message(s) is triggered, then the group update control 33 automatically outputs at 80 the selective PING (or PONG) message(s) to the appropriate communication device(s) in the group. An example of the aforementioned trigger condition is when no PING or PONG message has been received from a given device for more than a threshold time period.

After the selective PING (or PONG) messages are output, or if the trigger is not active at 88, then the output control determines at 91 whether or not the user is manually requesting that a message be sent. If not, then control returns to the decision block at 82. If so, then the PING or PONG message or messages are sent as desired at 93, and thereafter control returns to decision block 82.

Figure 9:
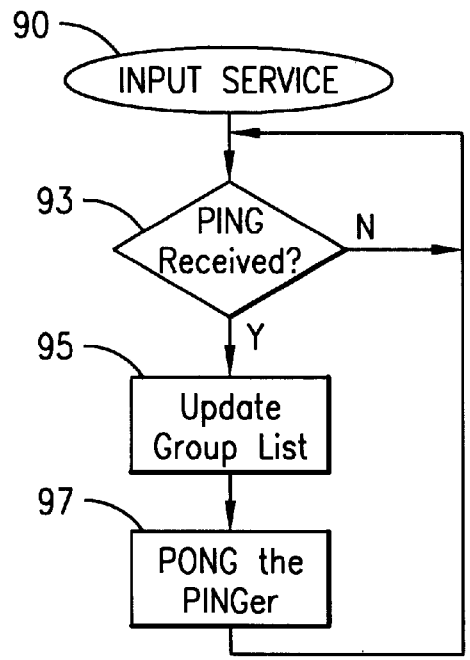
FIG. 9 is a flow diagram of an input service function performed by the group update control block of FIG. 3.
Figure 10:
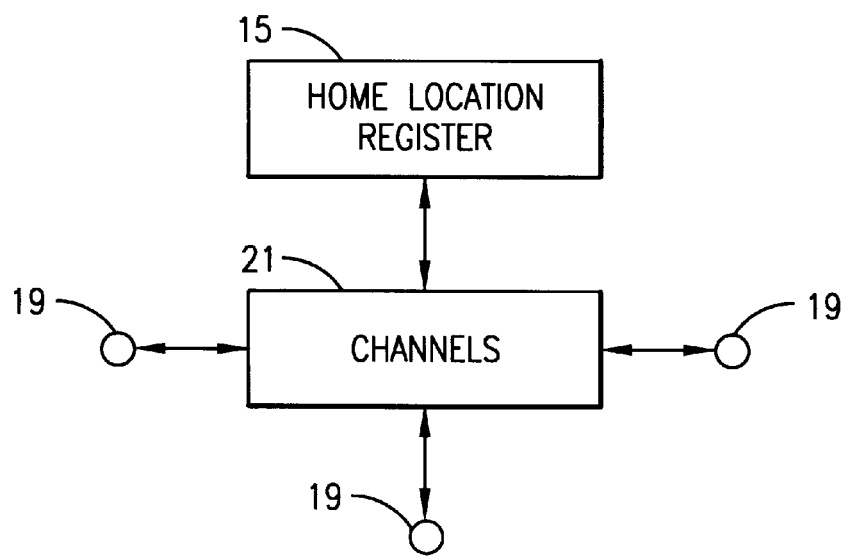
FIG. 10 is similar to FIG. 2 and illustrates conventional communication channels provided by the conventional system of FIG. 1.

Example FIG. 9 illustrates input service implemented by the group update control section 33 of the communication device 31 in FIG. 3. The input service 90 first determines at 93 whether or not a PING message has been received. Control does not proceed until a PING message has been received. If a PING message is received at 93, then the group update control section automatically updates the group list at 95 to include the status received in the PING message, and automatically outputs at 97 a PONG message to the device from which the PING message was received.

Figure 11:
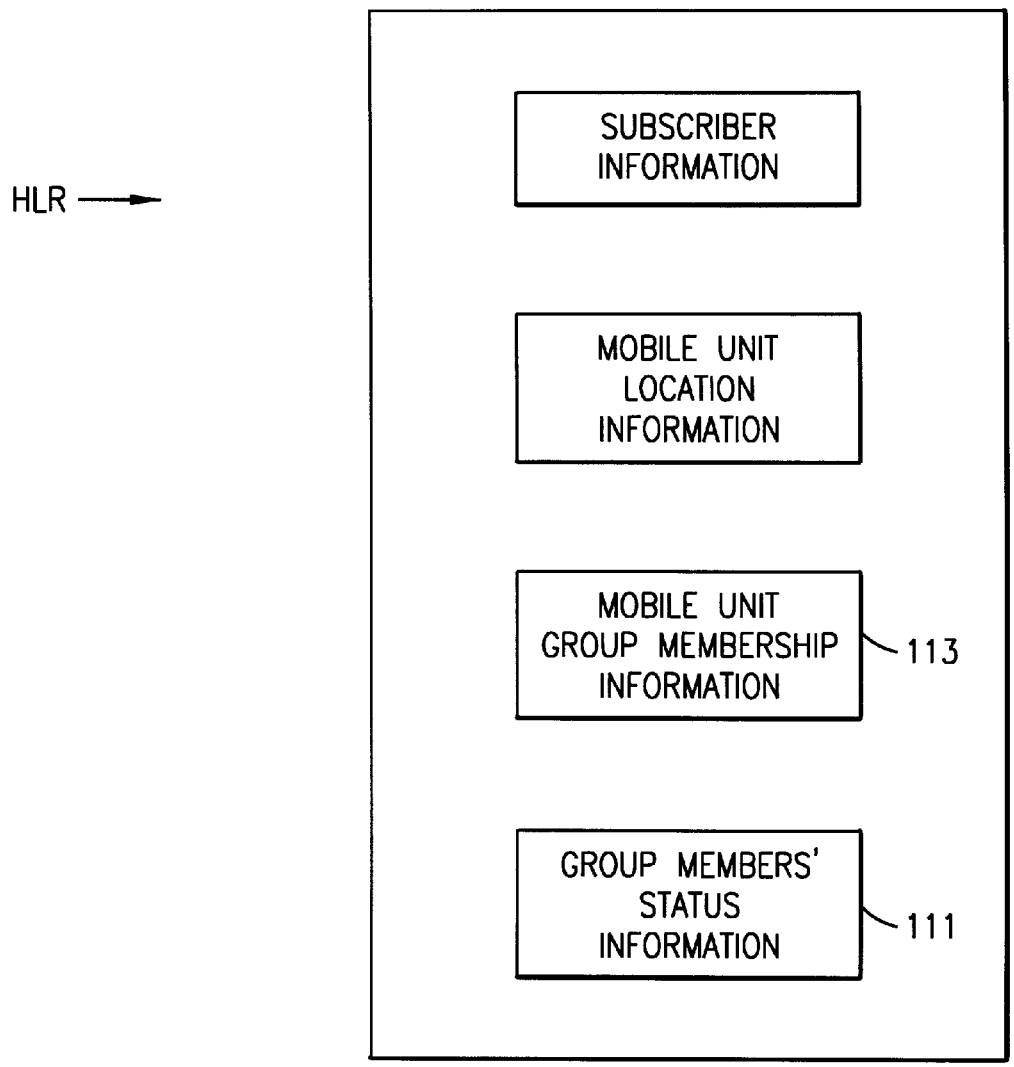
FIG. 11 illustrates a home location register according to the present invention.

Example FIG. 11 is a block diagram of a home location register (HLR) database according to the present invention. Various well-known conventional features of HLR are omitted from FIG. 11 for clarity of exposition. As is conventional, the home location register data base of FIG. 11 includes subscriber information and information about the location of the various mobile communications units. In addition, the home location register data base of FIG. 11 includes mobile unit group membership information and group member status information. These additional features according to the present invention enable the exemplary communications illustrated in FIGS. 12–14. As in FIGS. 4–7 above, FIGS. 12–14 illustrate wireless mobile telephones having the general features of FIG. 3.

Figure 12:
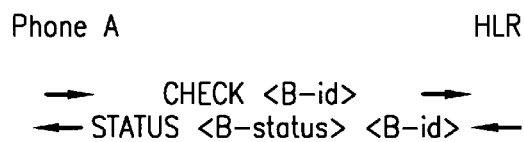
FIG. 12 illustrates an example of communication between a wireless mobile communication device and the home location register according to the present invention.

In particular, FIG. 12 illustrates phone A sending a "check phone B status" message to the HLR. In response, HLR automatically sends a message to phone A including the status and identification of phone B. Phone B then automatically update group list 35 accordingly.

Figure 13:
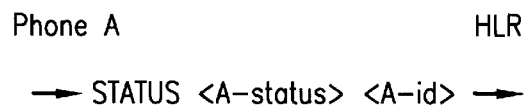
FIG. 13 illustrates another example of communication between a wireless mobile communication device and the home location register according to the present invention.

FIG. 13 illustrates phone A sending a "status update" message to HLR. The status update message includes the status of phone A and the identification of phone A.

Figure 14:
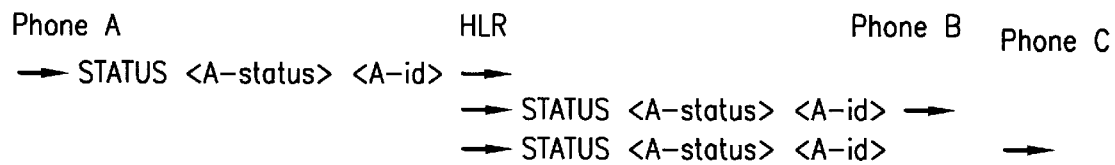
FIG. 14 illustrates communication between various wireless mobile communication devices and the home location register according to the present invention.

Example FIG. 14 is similar to FIG. 13 in that phone A sends a "status update" message to HLR including the status of phone A and the phone A identification information. However, FIG. 14 also illustrates that HLR automatically forwards this "status update" message to other phones in the group such as phone B and phone C. These other phones then automatically update their group lists 35 accordingly. The "status update" message of FIG. 14 will preferably include an identification of which group is selected to receive status updates, particularly if phone A is a member of more than one group.

Figure 15:
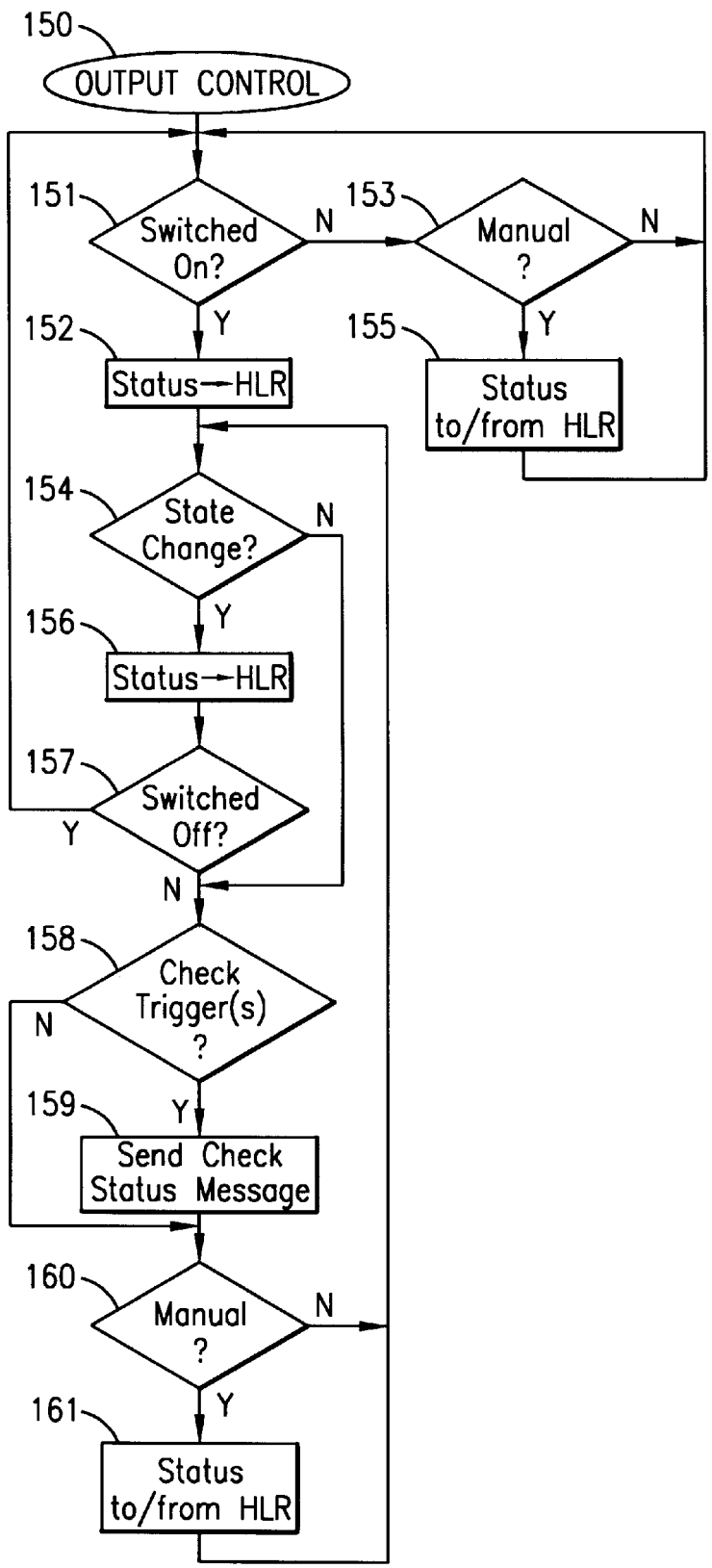
FIG. 15 is a flow diagram of another output control function performed by the group update control block of FIG. 3.

Example FIG. 15 illustrates output control implemented by the group update control section 33 of FIG. 3 when the communication sequences of FIGS. 12–14 are used. The output control 150 first determines at 151 whether or not the mobile communication unit has been switched on. If not, then it is determined at 153 whether or not the user is manually requesting a status update. If so, then the group update control section 33 can initiate a "check status" message (FIG. 12) or a "status update" message (FIG. 13), depending on which type of message has been manually selected. Thus, at 155, the mobile communication unit will either request a status update from HLR (see FIG. 12) or will send a status update to HLR (see FIGS. 13 and 14).

If the mobile communication unit is switched on at 151, then the unit will automatically send a status update message (see FIGS. 13 and 14) to HLR at 152. Thereafter, at 154, the input control monitors the status inputs of FIG. 3 to determine whether or not any of the monitored status inputs have changed. If so, then a status update message is automatically sent to HLR (see FIGS. 13 and 14) at 156. Thereafter, the output control determines at 157 whether or not the status change at 154 was the mobile unit being switched off. If so, then control returns to the decision block at 151. If not, then control proceeds to the decision block at 158, which is also the point to which control proceeds from 154 if there is no status change at 154.

At 158, the output control checks the trigger(s) to determine whether the group update control section should check the status of one or more of the other units in the group (see FIG. 12). An example trigger is when no status update of a given unit has been received for a threshold period of time. If a trigger is active at 158, then the "check status" message is issued at 159. Thereafter, control proceeds to the decision block at 160, which is also the point to which control flows from 158 if there is no active trigger at 158. It is determined at 160 whether or not the user is manually requesting a status update. If so, then status is either retrieved from HLR (see FIG. 12) or updated to HLR (see FIGS. 12 and 13) at 161. Thereafter, control proceeds back to decision block 154, which is also the point to which control proceeds from 160 if no manual request is detected at 160.

Workers in the art will recognize that the group update control section 33 described with respect to FIGS. 3–9 and 12–15 can be readily implemented in hardware or software, for example, within the data processing section of a conventional wireless mobile communication device.

Figure 16:
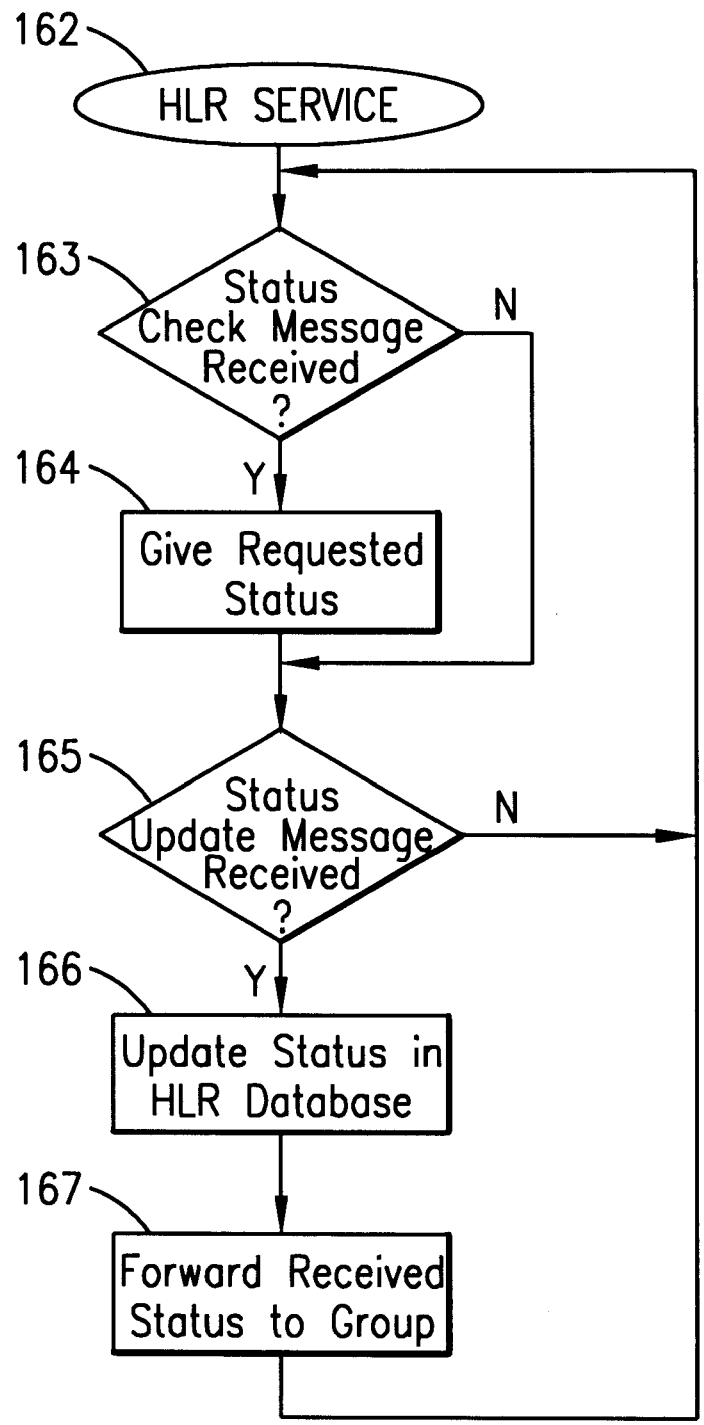
FIG. 16 is a flow diagram of an information service function provided by the home location register according to the present invention.

Example FIG. 16 illustrates at 162 the informational service provided by HLR according to the present invention. At 163, HLR determines whether a "check status" message (see FIG. 12) has been received from a mobile unit in the group. If so, then HLR provides the requested status (see FIG. 12) at 164. Thereafter, control proceeds to decision block 165, which is also the point to which control proceeds from 163 if no "check status" message is received at 163. It is determined at 165 whether or not a "status update" message is received (see FIGS. 13 and 14). If so, then HLR at 166 appropriately updates the status in its database (see group member status information section 111 in FIG. 11) and at 167 forwards the received status to the other members of the group (see FIG. 14).

The portions 111 and 113 of the HLR data base in FIG. 11 can be implemented as one or more lists that correspond to respective groups of users. Each entry of each list corresponds to a member of that group and contains, for example, the member's name, the unit's phone (or other identification) number, and the current status of the unit. Each list thus contains the pertinent information for all units/users in that group. Any desired group can be monitored by selecting the corresponding list in HLR.

A conventional Visiting Location Register (VLR) may also be modified to include portions 111 and 113 according to the invention. The modified VLR would then be capable of performing the operations described above with respect to HLR.

Considering again the examples of FIGS. 4–7 wherein the wireless mobile communication devices exchange status information directly with one another, in this environment the group list section 35 of the FIG. 3 wireless mobile communication device 31 can contain, for each group to which the device belongs, a corresponding group membership list. The communication of FIGS. 4–7 can alternatively be supported by implementing the group list section 35 as a general phone book listing, wherein each entry in the listing can be tagged as appropriate with one or more group memberships (and corresponding status). The group list section would also include a second list of all groups that are represented by the tagged entries in the general phone book listing, each entry in this second list corresponding to a group. A particular group can then be selected for monitoring by simply selecting the corresponding entry from the second list.

The group select input of FIG. 3 is a user input that selects which group is to be monitored. Moreover, the group select input can designate the selected group as a closed user group so that the device 31, while the closed user group designation is active, communicates to and receives communication from only the group members in the selected group.

Figure 17:
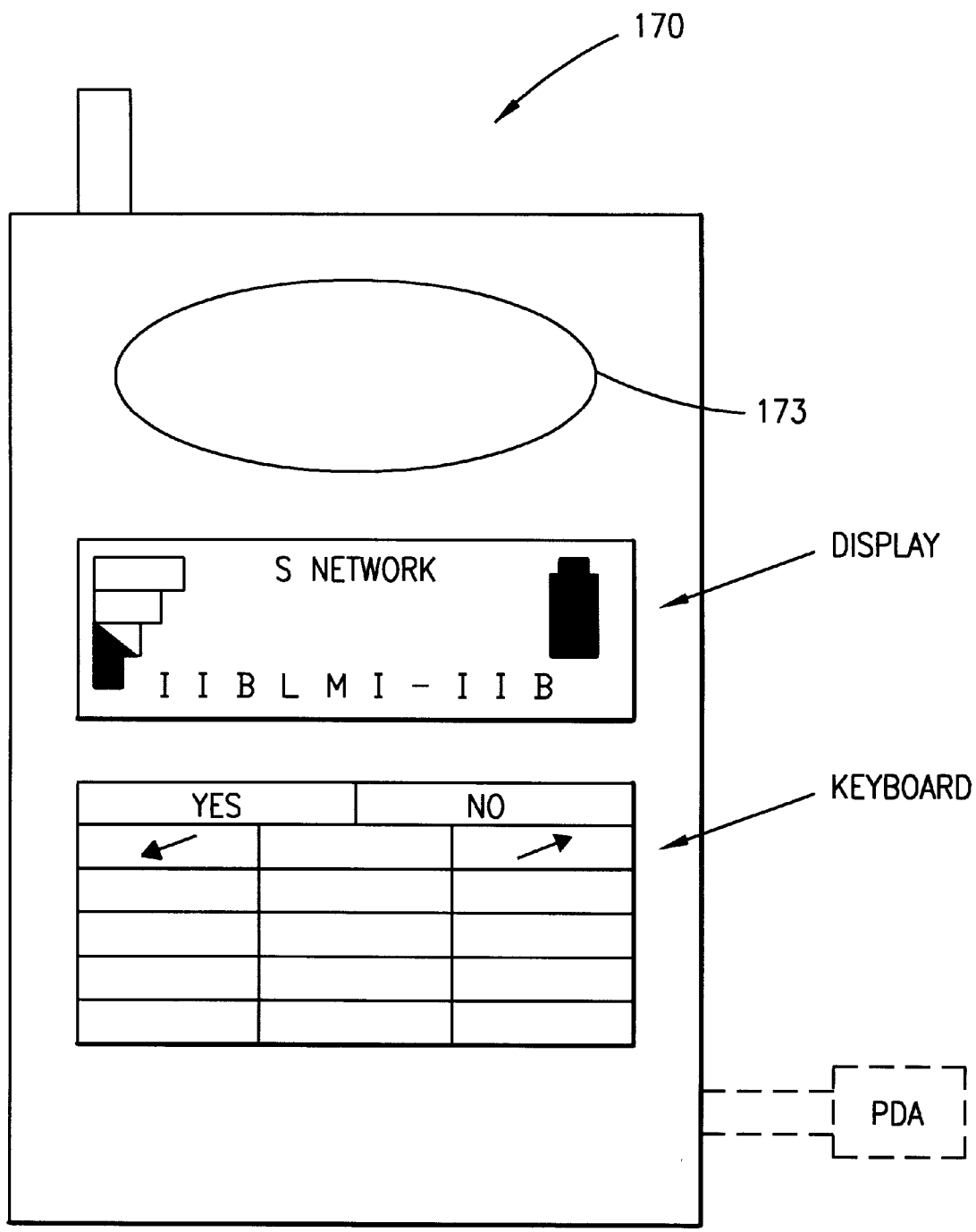
FIG. 17 is a physical perspective of an example wireless mobile communication device according to the present invention.

FIG. 17 illustrates pictorially a wireless mobile communication device 170 according to the present invention. The bottom line of the display shows the status of the monitored units. Each character from left to right corresponds respectively to the status of one of the units of the group being monitored. For example, I=idle, B=busy, L=lunch, M=meeting, –=phone switched off. The user can dial another unit manually or check the status of another unit manually by using the arrow keys in the keyboard to select the position on the display that corresponds to the desired unit. A group can define its own status characters for use in the display.

The group update control section 33 and the group list section 35 of FIG. 3 can be implemented within the unit 170 shown in FIG. 17, or can alternatively be implemented in a device connected to the unit 170, for example the personal digital assistant PDA shown in broken lines in FIG. 17.

Also, as an alternative to the display shown in FIG. 17, the status information can be presented using audible signals such as, for example, synthetic speech. The audible signals could be provided via a speaker 173 or an earphone.

Both of the aforementioned visible and audible status indications can be updated automatically whenever group list 35 is updated (see FIG. 3).

Although exemplary embodiments of the present invention have been described above in detail, this does not limit the scope of the invention, which can be practiced in a variety of embodiments.

What is claimed is:

1. A wireless mobile communication device, comprising:
   a memory having stored therein information that identifies other wireless mobile communication devices; and
   a control circuit coupled to said memory and having an output that, automatically and without having received a manual command to do so, requests from a selected one of the other wireless mobile communication devices information regarding the current status of a variable condition associated with the selected wireless mobile communication device.

2. The device of claim 1, wherein said control circuit output requests said information from all of the other wireless mobile communication devices.

3. The device of claim 1, including a sensory information channel connected to said control circuit to permit said information to be sensed by a user of said wireless mobile communication device.

4. The device of claim 3, wherein said sensory information channel includes a visual display.

5. The device of claim 3, wherein said sensory information channel includes an audio speaker.

6. The device of claim 5, wherein said speaker carries synthetic speech.

7. A wireless communication device, comprising:
   a status indicator that provides information regarding the current status of a variable condition associated with said wireless mobile communication device;
   a memory having stored therein information that identifies another wireless mobile communication device; and
   a control circuit coupled to said status indicator and said memory and having an output that, automatically and without having received a manual command to do so, communicates said information to the other wireless mobile communication device.

8. The device of claim 7, wherein said control circuit output communicates said information to the other wireless mobile communication device in response to a request received from the other wireless mobile communication device.

9. The device of claim 7, wherein said control circuit output communicates said information to the other wireless mobile communication device in response to a change in current status indicated by said status indicator.

10. The device of claim 7, wherein said memory includes information that identifies a plurality of other wireless mobile communication devices, and wherein said control circuit output communicates said information to said plurality of other wireless mobile communication devices.

11. The device of claim 7, wherein said memory has stored therein information that identifies a plurality of groups of other wireless mobile communication devices, and wherein said control circuit includes a group select input that identifies one of the groups, said control circuit output responsive to said group select input to communicate said information to the wireless mobile communication devices in the selected group.

12. The device of claim 11, wherein said control circuit is responsive to said group select input, while said group select input remains active, to limit said communication of said information to the wireless mobile communication devices in the selected group.

13. The device of claim 7, wherein said status indicator indicates the location of said wireless mobile communication device.

14. The device of claim 7, wherein said status indicator indicates that said wireless mobile communication device is one of off, idle and busy.

15. The device of claim 7, wherein said status indicator indicates that the user of said wireless mobile communication device is one of at lunch, performing a specific task, and attending a meeting.

16. The device of claim 7, wherein said control circuit output, automatically and without having received a manual command to do so, requests from the other wireless mobile communication device information regarding the current status of a variable condition associated with the other wireless mobile communication device.

17. The method of operating a wireless mobile communication device, comprising:
   using the wireless mobile communication device to identify a second wireless mobile communication device; and
   automatically and without receiving a manual command to do so, requesting the second device to provide information regarding the current status of a variable condition associated with the second device.

18. The method of claim 17, wherein said using step includes accessing a list of wireless mobile communication devices stored in a memory in the first-mentioned wireless mobile communication device.

19. The method of claim 17, wherein said requesting step is performed in response to an occurrence of a predetermined trigger event.

20. A method of operating a wireless mobile communication device, comprising:
   using the wireless mobile communication device to identify a second wireless mobile communication device; and
   automatically and without receiving a manual command to do so, communicating to the second device information regarding the current status of a variable condition associated with the first-mentioned device.

21. The method of claim 20, wherein said communicating step includes communicating the information to a plurality of other wireless mobile communication devices identified in a memory within the first-mentioned wireless mobile communication device.

22. The method of claim 20, including selecting a group of wireless mobile, communication devices from among a plurality of groups, said communicating step including communicating the information to the selected group of wireless mobile communication devices.

23. The method of claim 22, including limiting said communicating step to communication of the information only to the wireless mobile communication devices of the selected group.

24. The method of claim 20, including receiving from the second wireless mobile communication device a request for the information, and performing said communicating step in response to said request.

25. The method of claim 20, including determining whether the current status of a variable condition has change, and performing said communicating step only if the current status of the variable condition has changed.

26. A wireless mobile communication device, comprising:
   a memory having stored therein information that identifies other wireless mobile communication devices; and
   a control circuit coupled to said memory and having an output that, automatically and without having received a manual command to do so, requests from a stationary database information regarding the current status of a variable condition associated with a selected one of the other wireless mobile communication device.

27. A method of operating a wireless mobile communication device, comprising:
   using the device to identify a second wireless mobile communication device; and
   automatically and without receiving a manual command to do so, requesting a stationary database to provide information regarding the current status of a variable condition associated with the second wireless mobile communication device.

28. The method of claim 27, wherein said using step includes accessing a list of wireless mobile communication devices stored in a memory.

29. A method of operating a wireless mobile communication device, comprising:
   using the wireless mobile communication device to identify a second wireless mobile communication device;
   automatically and without receiving a manual command to do so, communicating to a stationary database information regarding the current status of a variable condition associated with the first-mentioned wireless mobile communication device; and
   forwarding the information from the database to the second wireless mobile communication device.

30. The method of claim 29, including forwarding the information from the database to a plurality of wireless mobile communication devices.

31. The method of claim 29, including selecting a group of wireless mobile communication devices from among a plurality of groups, and forwarding the information from the database to the wireless mobile communication devices of the selected group.

32. The method of claim 29, including determining whether the current status of the variable condition has changed, and performing said communicating step only if the current status of the variable condition has changed.

* * * * *

UNITED STATES PATENT AND TRADEMARK OFFICE
CERTIFICATE OF CORRECTION

PATENT NO.   : 6,032,051
DATED        : February 2, 2000
INVENTOR(S)  : Hans Hall et al It is certified that error appears in the above-identified patent and that said Letters Patent is hereby corrected as shown below:

Column 2:
Line 23        Replace "illustrate", with --illustrates--

Column 3:
Line 28        Replace "telephone", with --telephones--

Column 4:
Line 22        Replace "was a the", with --was the--
Line 45        Replace "93", with --92--
Line 45        After "other", Insert --selected--

Column 5:
Line 8         Replace "update", with --updates--

Column 7:
Line 40        After "wireless", insert --mobile--

Column 8:
Line 27        Replace "The", with --A--
Line 58        Replace "mobile, communication", with --mobile communication--

Column 9:
Line 4         Replace "a variable", with --the variable--
Line 5         Replace "change", with --changed--
Line 15        Replace "device", with --devices--

UNITED STATES PATENT AND TRADEMARK OFFICE
CERTIFICATE OF CORRECTION

PATENT NO. : 6,032,051
DATED : February 2, 2000
INVENTOR(S) : Hans Hall et al

It is certified that error appears in the above-identified patent and that said Letters Patent is hereby corrected as shown below:

Assignee: After "Ericsson", insert --(publ)--
Title of Invention   Replace "COMUNICATION", with --COMMUNICATION--

Signed and Sealed this

Twelfth Day of June, 2001

*Attest:*

*Attesting Officer*

NICHOLAS P. GODICI
*Acting Director of the United States Patent and Trademark Office*